United States Patent
Madhukar Lele et al.

(10) Patent No.: US 8,892,032 B2
(45) Date of Patent: Nov. 18, 2014

(54) METHOD AND SYSTEM FOR MANAGING DATA IN A NEAR FIELD COMMUNICATION NETWORK

(75) Inventors: Abhijit Madhukar Lele, Bangalore (IN); Arun Naniyat, Bangalore (IN); Deepak Dasarath Rao, Bangalore (IN); Eun-Tae Won, Seoul (KR); Thenmozhi Arunan, Bangalore (IN)

(73) Assignee: Samsung Electronics Co., Ltd (KR)

( * ) Notice: Subject to any disclaimer, the term of this patent is extended or adjusted under 35 U.S.C. 154(b) by 1367 days.

(21) Appl. No.: 12/480,427

(22) Filed: Jun. 8, 2009

(65) Prior Publication Data

US 2009/0325484 A1 Dec. 31, 2009

(30) Foreign Application Priority Data

Jun. 6, 2008 (IN) .......................... 1381/CHE/2008

(51) Int. Cl.
*H04B 5/00* (2006.01)

(52) U.S. Cl.
USPC ....................................... 455/41.1; 455/41.2

(58) Field of Classification Search
CPC ... H04B 5/0056; H04B 5/0031; H04W 4/008; H04W 12/06; H04W 4/206; H04W 92/18; H04W 28/06; H04W 28/18; H04W 84/18; H04W 76/02; H04W 84/12; H04W 84/10; H04W 72/00; H04L 67/141; H04L 63/0492; H04L 67/2842; H04L 63/18; H04L 63/08; H04L 63/0823; H04L 63/0428
USPC .......... 455/41.1, 41.2, 3.04, 63.1, 425, 552.1; 719/313, 321; 340/4.3–4.37, 4.4–4.42, 340/10.1, 5.73, 539.1, 539.11; 370/302, 370/295, 343, 310, 316, 341, 331, 252, 338, 370/469
See application file for complete search history.

(56) References Cited

U.S. PATENT DOCUMENTS

| | | | |
|---|---|---|---|
| 6,748,195 B1* | 6/2004 | Phillips | 455/41.2 |
| 2005/0218739 A1 | 10/2005 | Maddin et al. | |
| 2006/0084381 A1* | 4/2006 | Hartwig | 455/41.2 |
| 2008/0132167 A1* | 6/2008 | Bent et al. | 455/41.2 |
| 2008/0140667 A1* | 6/2008 | LaBiche | 707/10 |
| 2008/0224825 A1 | 9/2008 | Nystrom et al. | |
| 2008/0252415 A1* | 10/2008 | Larson et al. | 340/5.73 |

FOREIGN PATENT DOCUMENTS

| | | |
|---|---|---|
| EP | 1 633 104 | 3/2006 |
| EP | 1 865 689 | 12/2007 |
| KR | 1020080033291 | 4/2008 |
| WO | WO 2004/089006 | 10/2004 |
| WO | WO 2008-021032 | 2/2008 |

OTHER PUBLICATIONS

Tm Rtd: "NFC Record Type Definition (RTD) Technical Specification NFC Forum", XP 055139371, Jul. 24, 2006.

\* cited by examiner

*Primary Examiner* — Golam Sorowar
(74) *Attorney, Agent, or Firm* — The Farrell Law Firm, P.C.

(57) ABSTRACT

A method and system for managing data between a plurality of electronic devices in a Near Field Communication (NFC) network are provided. The method is performed at a first electronic device. A request is received from a second electronic device to send context data. The context data is then represented in accordance with a context Record Type Definition (RTD). The context RTD is used for defining context data in the NFC network. The context data that is represented in accordance with the context RTD is exchanged with the second electronic device.

9 Claims, 10 Drawing Sheets

| MB | MF | CF | SR | IL | TNF | ~302

| Type length | ~304
| Payload Length 1 | ~306a
| Payload Length 2 | ~306b
| Payload Length 3 | ~306c
| Payload Length 4 | ~306d
| ID Length | ~308
| Type = CA | ~310
| ID = CA specific like Loc | ~312
| CA specific Payload | ~314

FIG.3

| | Bitmap_Control | ~402 |
|---|---|---|
| | TLV Privacy Level | ~404 |
| | TLV Time Stamp | ~406 |
| | TLV Validity | ~408 |
| Control Fields that guide the usage of the Context Data | TLV Location Specific | ~410 |
| | TLV Trust Level | ~412 |
| | TLV Action to be taken on the Context Data | ~414 |
| | TLV Other Control Fields | ~416 |
| | TLV Schema/Fomat | ~418 |
| | Context Data | ~420 |

METHOD AND SYSTEM FOR MANAGING DATA IN A NEAR FIELD COMMUNICATION NETWORK

PRIORITY

This application claims priority under 35 U.S.C. §119(a) to an Indian Patent Application filed in the Indian Intellectual Property Office on Jun. 6, 2008 and assigned Serial No. 1381/CHE/2008, the disclosure of which is incorporated herein by reference.

BACKGROUND OF THE INVENTION

1. Field of the Invention

The present invention relates generally to the management of data between a plurality of electronic devices through short-range wireless communication, and more particularly, to a method and system for managing data between a plurality of electronic devices in a Near Field Communication (NFC).

2. Description of the Related Art

Portable electronic devices, such as mobile phones and Personal Digital Assistants (PDAs), are frequently used for communication, such as for example, Short Field Communication (SFC), Near Field Communication (NFC) and communication over a telecommunication network. However, the use of portable electronic devices is not limited to communication. They can also be used for storing context information, storing personal information, aggregating information, sharing data, listening music, and watching stored videos.

For example, a user of a mobile phone can store personal information or context information in the mobile device. Context information is any information that can be used to characterize the situation of an entity. An entity is a person, place, or object that is considered relevant to interaction between a user and an application. Further, the context information can change dynamically based on the environment of the user.

Through the use of electronic devices the user can share data, such as personal information and/or context information, with other electronic devices. The data can be shared between two electronic devices through a telecommunication network, a short range wireless communication network, and the like. For example, a mobile phone can share a data file with another electronic device through short range wireless communication, for example, short range radio (Bluetooth®), InfraRed light (IR) and NFC.

For sharing data using Bluetooth® or IR, a user performs several manual activities, such as selecting data to be sent, activating a communication technique (for example, activating Bluetooth), searching for an electronic device in the vicinity of the mobile phone, selecting an electronic device to which the data is to be sent, and sending the data to the selected electronic device. For the following description the term Bluetooth® will also be referred as Bluetooth (BT).

However, in NFC, which is a short-range high frequency wireless communication technology, a communication channel is established automatically as soon as two electronic devices are placed close proximity to one another. NFC enables the exchange of data between devices that are within ~10 centimeters (cm). Further, NFC is a short range wireless communication technology that has evolved from a combination of contactless, identification and networking technologies and is complementary to long range technologies.

Thus, in NFC, manual intervention for sharing and exchanging data is very minimal. Hence, it is more convenient for users to share data using NFC. But currently through NFC, only transfer of static data is possible. There exists no method in NFC for exchanging context information between a plurality of electronic devices. Also, the information cannot be aggregated and changed dynamically between a plurality of electronic devices.

SUMMARY OF THE INVENTION

The present invention has been made to address at least the above problems and/or disadvantages and to provide at least the advantages described below. Accordingly, an aspect of the present invention provides a method and system for managing data between a plurality of electronic devices in an NFC.

According to one aspect of the present invention, a method is provided for managing data between a plurality of electronic devices in an NFC network. The method is performed at a first electronic device. A request is received from a second electronic device to send context data. The context data is then represented in accordance with a context Record Type Definition (RTD). The context RTD is used for defining context data in the NFC network. The context data that is represented in accordance with the context RTD is exchanged with the second electronic device.

According to another aspect of the present invention, an electronic device is provided. The electronic device includes a processor and a transceiver. The processor represents context data based on a context RTD. The context RTD is a record type definition used for defining context data in the NFC network. The transceiver receives a request from a second electronic device to send the context data. The transceiver further enables exchange of the context data that is represented based on the context RTD with the second electronic device.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

It should be understood that the terms used to describe various embodiments are provided to merely aid the understanding of the description, and that their use and definitions in no way limit the scope of the invention. Terms first, second, and the like are used to differentiate between objects having the same terminology and are no where intended to represent a chronological order, as and where stated otherwise. A set is defined as a non-empty set including at least one element.

Figure 1A:
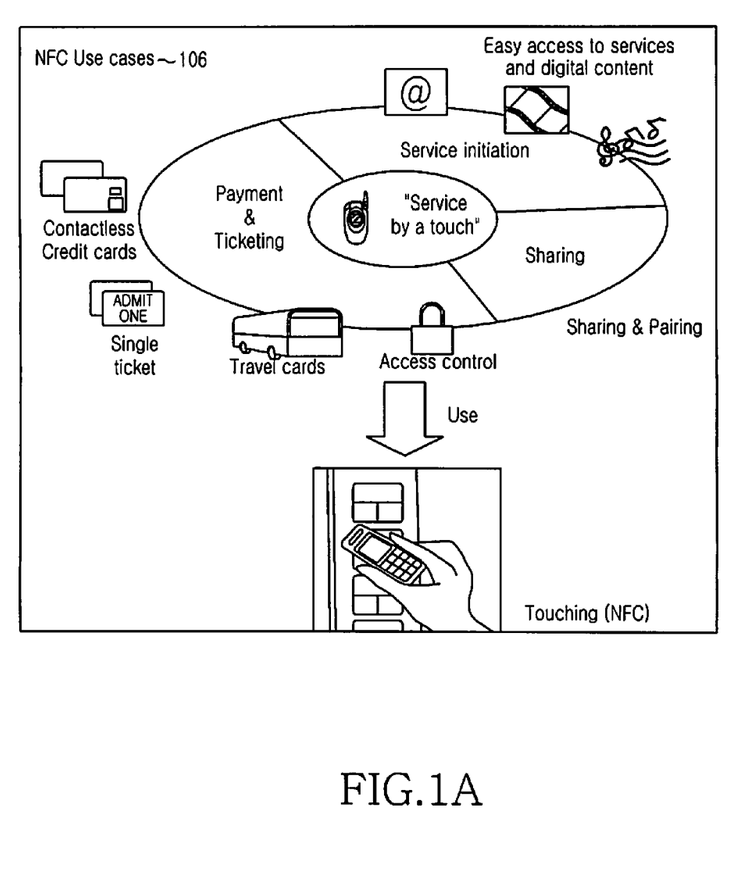
FIG. 1A and FIG. 1B are diagrams illustrating an environment, in accordance with an embodiment of the present invention.
Figure 1B:
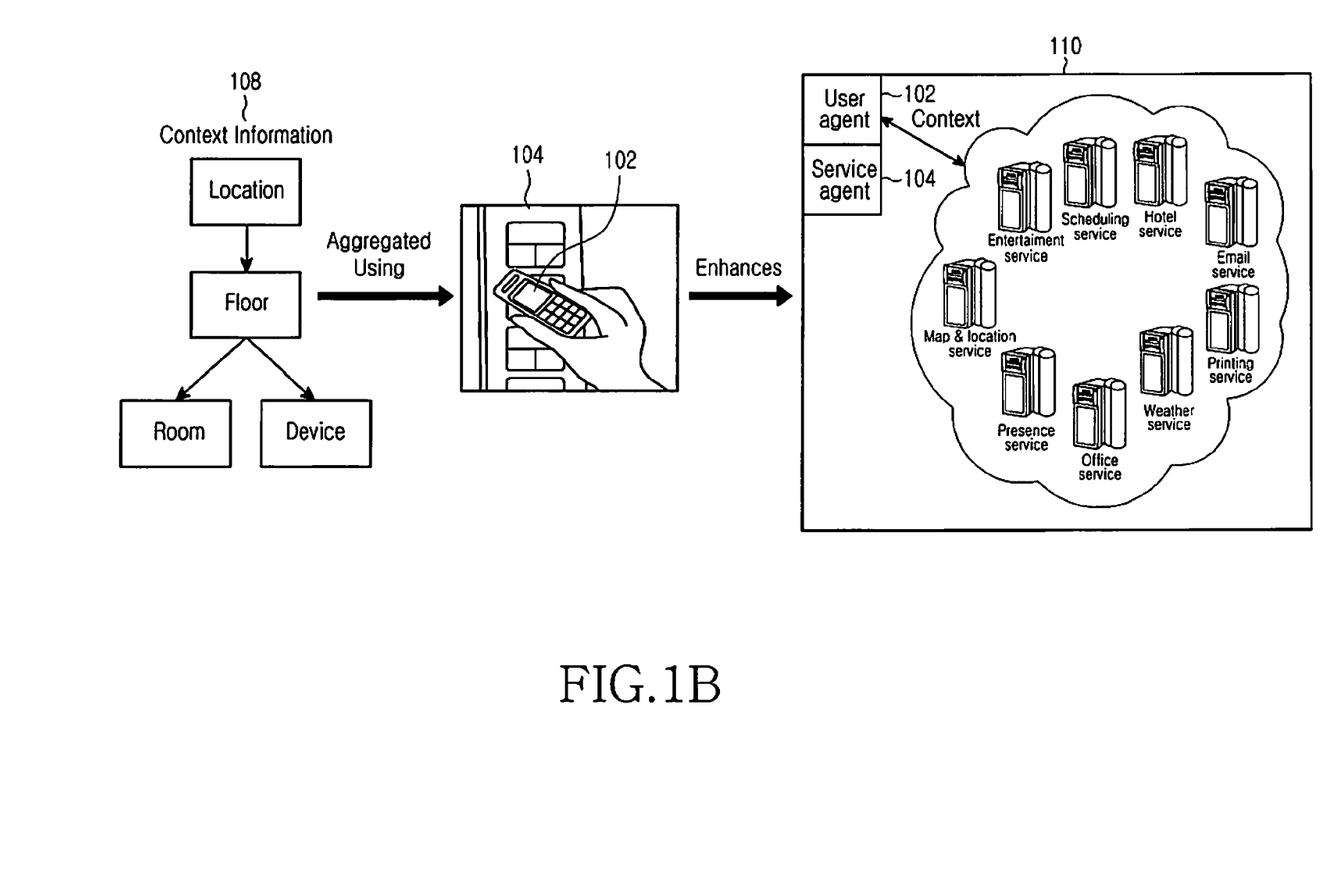

FIG. 1A and FIG. 1B illustrate an environment 110 in accordance with an embodiment of the present invention. The environment 110 includes a plurality of electronic devices, for example, an electronic device or user agent 102 and an electronic device or service agent 104. However, while only two electronic devices are shown in the environment 110, it will be apparent to the person ordinarily skilled in the art that the environment 110 may include more electronic devices or a plurality of non-electronic devices. The examples of electronic devices 102 and 104 include, but are not limited to, mobile phones, televisions, PDAs, and computers.

In an embodiment of the present invention, the electronic devices 102 and 104 are capable of communicating with each other using a telecommunication network. In another embodiment of the present invention, the electronic devices 102 and 104 are capable of communicating with each other through short-range wireless communication technology. Examples of short range wireless communication technology includes but are not limited to, short range radio (BT), IR and NFC. Hence, the electronic devices 102 and 104 are capable of communicating with each other through NFC technology.

In the environment 110, a user of the electronic device 102 exchanges context information between the electronic device 104 and the electronic device 102 through NFC. The different fields in which context data may be used are shown as use cases 106. In an embodiment of the present invention, the electronic devices 102 and 104 are known as NFC devices. In an embodiment of the present invention, the electronic device 104 takes the role of an aggregator device. The aggregator device is a device that aggregates context data received from a plurality of devices. The aggregator device dynamically arranges context data corresponding to each of the electronic devices in a memory.

In NFC, the electronic devices, for example electronic devices 102 and 104, can communicate in three application modes. The three application modes are Peer-to-Peer mode, Reader/Writer mode, and Card Emulation mode. In the Peer-to-Peer mode of communication, both NFC devices have similar capability and there is no distinction between the NFC devices. In the Reader/Writer mode of communication, one of the NFC devices has the capability of the Reader/Writer and the other NFC device is a simple tag. In the Card Emulation mode of communication, one of the NFC devices is a reader and the other NFC device could be a simple tag. Hence, the information can be exchanged through any of the application modes described above.

To transfer data in the NFC network, the data is represented based on well-defined NFC data formats called RTDs. The RTDs are in turn packaged in a format called NFC Data Exchange Format (NDEF). Different types of RTDs in NFC standards are for example, Smart Poster RTD, Text RTD, URI RTD, Web RTD, and the like.

In the Peer-to-Peer networks, participating users/devices may exchange context information 108 with other electronic devices, as shown in FIG. 1B. Examples of context information 108 include, but are not limited to, user profile, current location of the user, user preferences, room temperature, user's blood pressure, user's emotion, user's presence, user's identity, and the like. The context information can be private information associated with the users and can even vary with time and environment.

However, the set of defined RTDs are not sufficient to define CA information, which can be required by Peer-To-Peer devices and applications. Hence, a context RTD can be used for exchanging and transferring context information over the NFC interface. The structure of the context RTD is explained in conjunction with FIG. 3 and FIG. 4. For the sake of clarity and for the purpose of this description the context data is also referred as context information. Further, the electronic device 104 is also referred as the aggregator 104.

In an embodiment of the present invention, the context data from different nodes and/or electronic devices is aggregated at a single node and the node is called the aggregator. The aggregated context data at the aggregator is represented by an extended form of Context RTD. For example, in FIG. 1A and FIG. 1B, a context environment can be established by exchanging context information through easily readable tags. The aggregator device, for example, electronic device 104, can capture the context information from various electronic devices and aggregate them for the use of other devices.

In an embodiment of the present invention, when a user of the electronic device 102 enters the context environment, the context data associated with the electronic device 102 and the context environment are exchanged over the NFC interface. The use case 106 in the FIG. 1A shows a plurality of cases where the NFC technology can be used. Examples of NFC uses, sharing files, payment, ticketing, and the like. The context information can be exchanged through a stored NFC tags as per a NFC pre-defined format, RTD.

In FIG. 1B when the user of the electronic device 102 touches the electronic device 104 the context information 108 of the user, for example location, floor, and room information of the user, are updated in the environment and other context information is updated in the electronic device 102. Thereafter, the context data can be used for managing different applications using one or more short-range wireless communication networks. For example, the context information 108 gathered by electronic device 102 is used by different applications communicating over BT and a BT profile is derived for such a context transfer operation.

Figure 2:
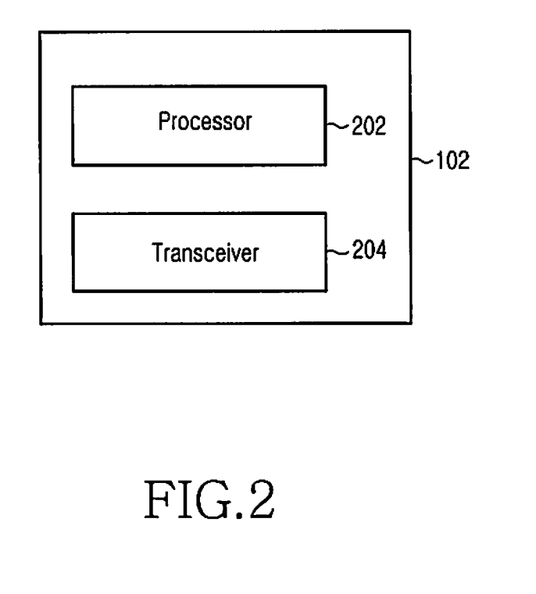
FIG. 2 is a diagram illustrating an electronic device, in accordance with an embodiment of the present invention.

FIG. 2 illustrates the electronic device 102 in accordance with an embodiment of the present invention. The electronic device 102 includes a processor 202 and a transceiver 204. The processor 202 processes context data in the electronic device 102. In an embodiment of the present invention, the processor 202 represents the context data based on a context RTD. The context RTD is a record type definition used for defining context data in the NFC network.

The transceiver 204 receives a request from one or more electronic devices to send context data. Hence, when the transceiver 204 receives the request, the processor 202 represents the context data in the context RTD format. Thereafter, the transceiver 204 exchanges the context data that is represented based on the context RTD with the one or more electronic devices. In an embodiment of the present invention, the transceiver 204 transmits the processed context data to other electronic devices. Similarly, the transceiver 204 receives the context data from the other electronic devices.

Figure 3:
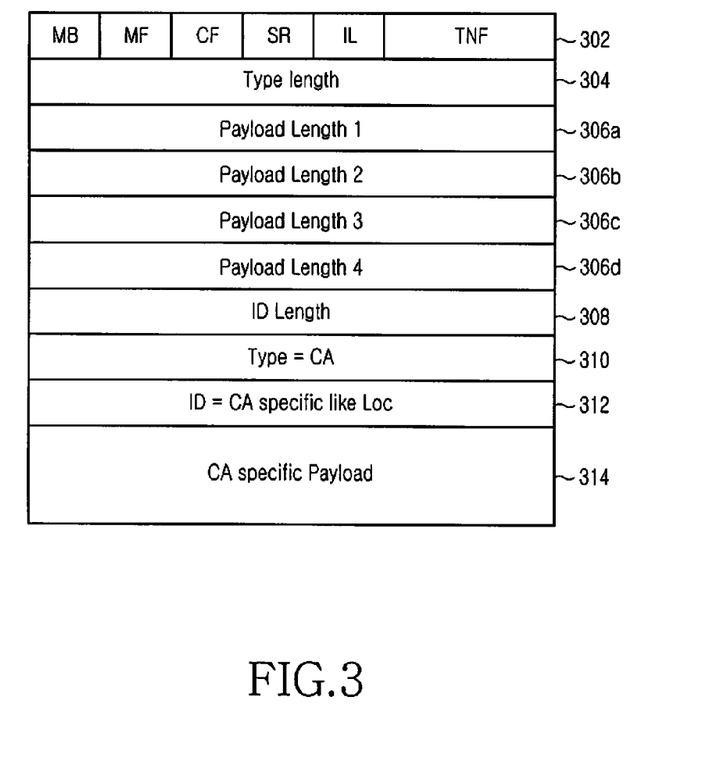
FIG. 3 is a diagram illustrating an NFC Data Exchange Format (NDEF) structure for a Context Record, in accordance with an embodiment of the present invention.

FIG. 3 illustrates a NDEF structure for a context RTD, in accordance with an embodiment of the present invention. The NFC enables the exchange of data in a plurality of formats and for a plurality of applications. Hence, the NFC forum defines a plurality of data formats using a plurality of RTDs. Examples of the plurality of RTDs include Smart Poster, Handover of Configuration information, Web Access, and the like.

In an embodiment of the present invention, the RTD can be used individually and/or can be part of an NDEF message. The RTD has a plurality of header fields that represent a plurality of information that is associated with data. The plurality of information associated with the data includes control information of a record, a type of data, a payload length of the data, an identity field, and the like. Hence, the plurality of information associated with the context data is stored in a plurality of byte fields, for example a byte field 302, a byte field 304, a byte field 306, a byte field 308, a byte field 310, and a byte field 312.

The byte field 302 represents a first byte that includes control information for the NDEF message associated with the context data. The byte field 302 includes a plurality of information that is included in a plurality of bit fields. Each of the plurality of bit fields signifies specific information associated with the context data. In an embodiment of the present invention, the byte field 302 is divided into six bit fields represented as MB, MF, CF, SR, IL and TNF.

Each of the six bit fields signifies specific information, for example, MB represents Message Begin, ME represents Message End, CF represents Chunk Flag, SR represents Short Record, IL represents ID Length field, TNF represents Type Name Format. The different bit fields can represent different values for representing the data. For example, the TNF can have the value 0x01 or 0x04.

The byte field 304 represents type length of the type field shown in byte field 310. The Payload length byte fields, for example the byte fields 306*a*, 306*b*, 306*c*, and 306*d*, give the length of the context payload that is given in 314. The byte field 308 represents ID length of the data. Hence, the byte field 308 provides the length value of the ID. The byte field 310 represents the Type of the payload. For example, the 'Type' of the payload is CA for context data.

The byte field 312 represents an ID field. The ID field is used to identify the context. For example, the ID field is used to identify location, user, presence or other sensor data. Further, the byte field 314 represents payload associated with the type of data. For example, the byte field represents CA specific payload. For the sake of clarity, summary of the different fields used in the Context RTD is provided in Table A. In Table A, a first column represents field names. The second column has the description of corresponding field.

TABLE A

| Field Name (Region marked in the FIG. 3) | Description |
| --- | --- |
| Payload Length 1-4 (306-306a to 306d) | Indicates the total length of the payload. |
| ID Length (308) | Indicative of the length of the Identifier field. |
| Type (310) | Indicates the type of RTD. The details of the types for context RTD is given in Table B, shown below. If the RTD is for "Context" information, then Type = 0x00xxxx |
| Identifier, ID (312) | Indicate the type of the Context information being captured as a part of the context RTD. |

TABLE A-continued

| Field Name (Region marked in the FIG. 3) | Description |
| --- | --- |
| CA Specific Payload (312) | For e.g., if ID = 0x0001 then the type of context information is "Location". Used to capture the complete context information along with its security, privacy, validity time, and associated interpretation schema. |

The details of the types for context RTD are provided in Table B shown below. In Table B, a first column represents Record Name and a second column gives the Description of the corresponding record name.

TABLE B

| Record Name | Description |
| --- | --- |
| Sp | Smart Poster |
| U | URI record |
| Act | Action Record of Smart Poster |
| T | Text |
| W | NFC Web |
| R | Resource |
| MI | Meta Information |
| Gc | Generic Control RTD |
| T | Target |
| D | Data Record |
| Hr | Handover Request Record |
| Hc | Handover Carrier Record |
| Hs | Handover Select Record |

Figure 4:
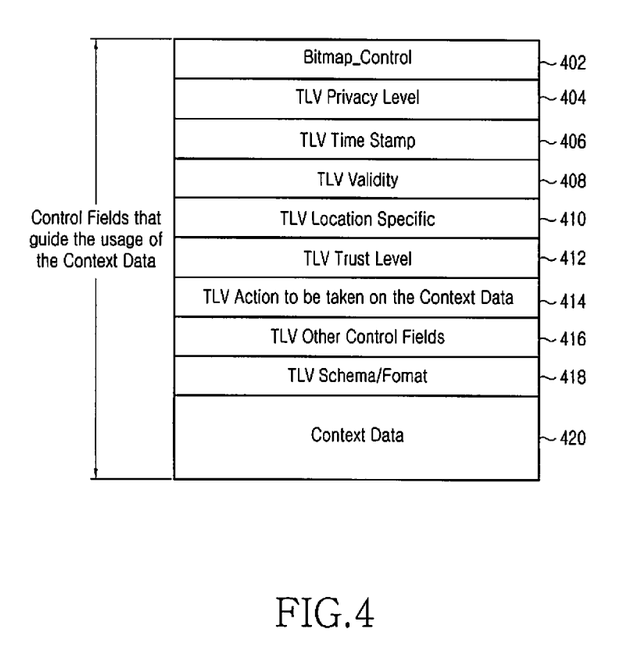
FIG. 4 is a diagram illustrating different formats for a context payload, in different embodiments of the present invention.

FIG. 4 illustrates formats for the context payload, in accordance with different embodiments of the present invention. The format is divided into a plurality of fields. A field 402 is a Control_Bitmap field. The field 402 is a two-byte field. Further, the field 402 represents a bitmap where each bit is used to indicate if the corresponding control field information is present in this context representation. A field 404 in the format is a TLV privacy level. Hence, the field 404 is represented in the Type Length Value (TLV) format and indicates the privacy level that should be satisfied for using the context payload.

The TLV for each control can vary based on the context data. Hence the TLV Privacy Level field (the byte field 404) is used to indicate privacy level expected for exchange of the context data. A field 406 is a TLV Time Stamp field. The field 406 is used to express time at which the context data was captured. The field 408 represents the TLV Validity. Further, the field 408 indicates a time duration for which the context data will be valid. The context data after the TLV validity time expires is not assumed valid.

A field 410 represents a TLV Location Specific data. The field 410 indicates parameters that are considered along with location context data given in the payload. For example, a relative GPS coordinate associated with the context data can be represented with this field. A field 412 represents a TLV Trust Level. The field 412 is used to indicate trust level that needs to be satisfied by the electronic device while reading the context data in the payload.

A field 414 represents TLV Action to be taken on the context data. The field 414 indicates action that a first electronic device expects a second electronic device to take. A field 416 represents a TLV Other Control fields. The field 416 is used to mention other control fields that are specific to the electronic device and/or application that will use the context data.

A field 418 represents a TLV Schema/Format. The field 418 is used to indicate schema or format in which the context data is represented. Thereafter, a field 420 represents a context data. The field 420 represents the context data in a pre-agreed format. For the sake of clarity, summary of the different fields for the context payload is provided in Table C. In Table C, a first column represents field names. The second column has the description of corresponding field.

TABLE C

| | |
|---|---|
| Privacy Flag | This field is used to indicate the privacy setting of the context record. |
| Other Privacy (Reserved) | These bits are reserved for future use. |
| Time Specific Validity | This field is used to indicate the time duration for which the received context information is valid. |
| Location Specific Validity | This field is used to indicate the location over which the context information is valid. In one of the embodiments, the location specific field can take the form of GPS co-ordinates. In another embodiment, the location specific field can be a free form such as "office" or "home". |
| Constraints on Interpretation (CoI) | This field indicates the schema that is to be used to interpret the received context information. In one of the embodiments, the "CoI" field can be a URI/URL pointing to a schema (for e.g., SOUPA) that is to be used for interpretation. |
| Context Payload | This field is used to actually capture the context information. In one of the embodiments, the context information is captured in xml format. A example of context payload is as follows:<br><CA_ID> Loc<CA_ID><br><Loc><br>   <addr><br>      <street> <..........> <street><br>      <street> <..........> <street><br>      <city> <.............> <city><br>      <tel> <............> <tel><br>      <zip> <............> <zip><br>   <addr> //end of addr definition in Location<br>   <GPS><br>      <lat> <........> <lat><br>      <long> <......> <long> <GPS><br>      <name> <Hospital> <name> //this name can be from a pre-defined list of names like Hospital, Home, Office, Road, Shopping etc...<br><Loc> |

Figure 5:
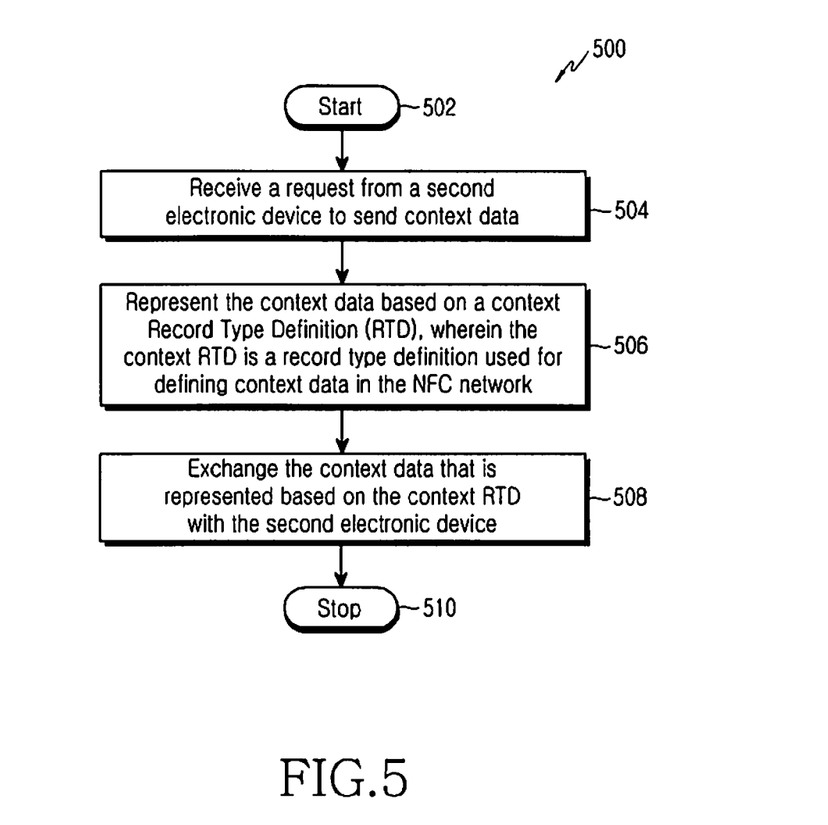
FIG. 5 is a flow diagram illustrating a method for managing data in an NFC network, in accordance with an embodiment of the present invention.

FIG. 5 illustrates a flow chart depicting a method for managing data in a NFC network, in accordance with an embodiment of the present invention. To explain the method 500, references will be made to FIG. 1. However, it will be apparent to a person ordinarily skilled in the art that the present invention can be explained with the help of any other suitable embodiment of the present invention. The method 500 can also include a different number of steps than those depicted in FIG. 5. Further, the order of the steps may also vary. In an embodiment of the present invention, the method is performed by the communication device.

At step 502, the method 500 is initiated. At step 504, the method receives a request from a second electronic device to send context data. In an embodiment of the present invention, the request is sent when the first electronic device and the second electronic device are in close proximity of one another. At step 506, the context data in the first electronic device is represented based on a context RTD. In an embodiment, the context RTD is a record type definition used for defining context data in the NFC network.

At step 508, the context data that is represented based on the context RTD is exchanged with the second electronic device. In an embodiment of the present invention, the exchange of the context data includes interchanging one or more NFC RTD with the second electronic device. In another embodiment of the present invention, the context data is also encapsulated with control parameters in the context RTD prior to exchanging the context data.

The context data assembled in the context RTD can be used by different applications. In an embodiment of the present invention, the different applications include BT applications. The applications are used based on context data represented using context RTD and/or one or more BT profiles. The context data received from a plurality of electronic devices can also be aggregated in an electronic device, for example the aggregator 104.

In an embodiment of the present invention, the electronic device receives context data from a plurality of electronic devices through one or more wireless communication networks. In another embodiment of the present invention, one or more wireless communication networks include one or more short-range wireless communication networks. Further, the context data in the context RTD format is aggregated based on the context data received from each of the plurality of electronic devices. For example, the context information received from the first electronic device is maintained corresponding to the first electronic device number.

In an embodiment of the present invention, the NFC network between the first electronic device and the second electronic device is based on a peer-to-peer mode of communication. In another embodiment of the present invention, the NFC network between the first electronic device and the second electronic device is based on a reader/writer mode of communication.

At step 510, the method 500 is terminated.

Figure 6:
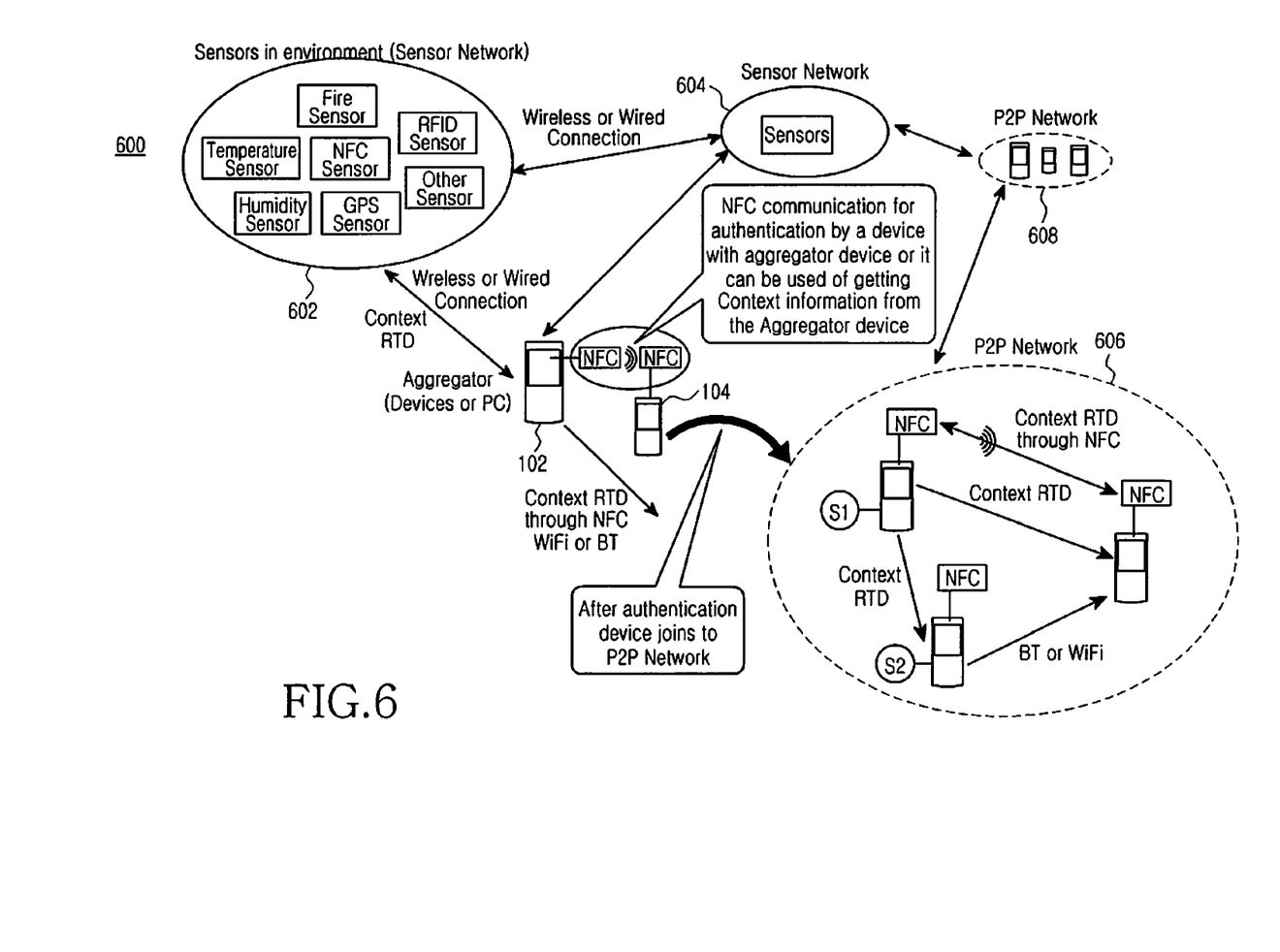
FIG. 6 is a diagram illustrating an environment, in accordance with another embodiment of the present invention.

FIG. 6 illustrates an environment, in accordance with another embodiment of the present invention. The environment 600 includes, a plurality of network of sensors, for example, a network of sensors 602 and a network of sensors 604, an aggregator device, for example, the electronic device 104, an electronic device capable of enabling NFC, for example the electronic device 102, and a plurality of Peer-to-Peer networks (P2P), for example, a Peer-to-Peer (P2P) network 606 and a Peer-to-Peer (P2P) network 608. In a Peer-to-Peer (P2P) network, devices communicate through BT, Wi-Fi wireless connection, and the like. The electronic devices include various sensors and are enabled with various features.

In an embodiment of the present invention, the electronic devices are associated with one or more sensors such as GPS, RFID, and temperature sensors. A P2P network can communicate with another P2P network through a wireless network or a wire lined communication network. For example, the P2P network 606 and the P2P network 608 can communicate with each other through a wireless communication network.

In the environment 600, the aggregator is a device or a computer that aggregates a plurality of information and can communicate with other networks and electronic devices. For example, the electronic device 102 or the aggregator 104 communicates with a sensor network using a wired (LAN, USB) or a wireless (Wi-Fi, BT, NFC) connection. Further, the aggregator 104 also communicates with the electronic device 102 through NFC, BT, and the like.

The aggregator 104, aggregates information received from all the sensors and arrange in Context RTD format, as shown in FIG. 3. Further, the electronic device 102 also stores context data associated with a plurality of users. When an NFC device, for example the electronic device 102, establishes a communication link with the electronic device 104, context data associated with the user of the electronic device 102 can be exchanged between the electronic devices 102 and 104.

In an embodiment of the present invention, the electronic device 102 also shares updated information with a plurality of electronic devices associated with it through a communication link. Therefore, the electronic device 102, after establishing a communication link with the electronic device 104, exchanges the updated context data aggregated in the electronic device 104. Hence, when the user of the NFC device 102 enters the region of the P2P network 606, the electronic devices in the P2P network 606 can exchange context data with the electronic device 102 based on the updated information received from the electronic device 102.

In an embodiment of the present invention, the context data represented in a context RTD format can be shared between an NFC device and a non-NFC device using short-range wireless communication networks. In an embodiment of the present invention, the non-NFC device can be a BT enabled device. Hence, the context data represented in a context RTD can also be accessed by the non-NFC devices using different profiles.

Figure 7:
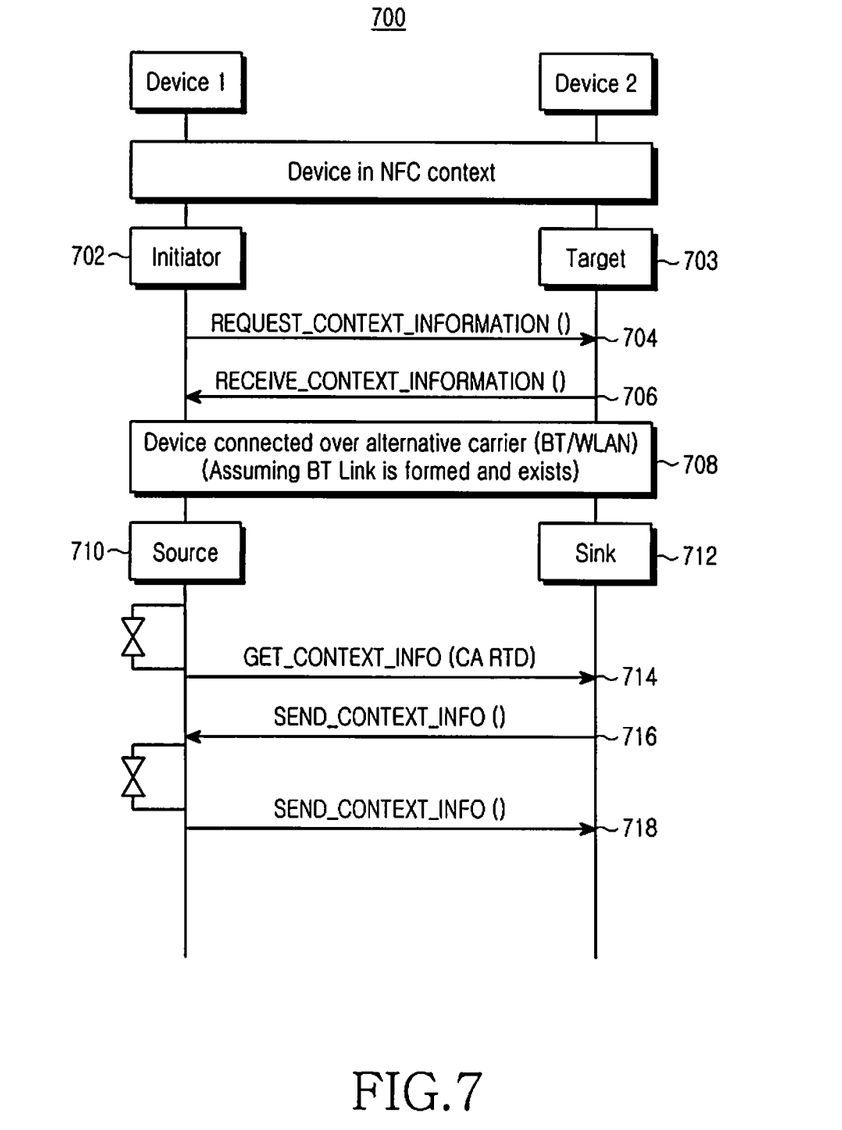
FIG. 7 is a message flow diagram illustrating a method for managing data in an NFC network, in accordance with an embodiment of the present invention.

FIG. 7 illustrates a message flow diagram depicting a method to manage data in a NFC network, in accordance with an embodiment of the present invention. In the environment 700, a first device, initiator 702, is initially authenticated. The initiator 702 requests context information from a second device, target 703, using a REQUEST_CONTEXT_INFO( ) primitive.

At step 704, the initiator 702 sends REQUEST_CONTEXT_INFORMATION( ) primitive to the target 703. The target 703 composes appropriated response using a Context RTD and then sends the context data as RECEIVE_CONTEXT_INFORMATION( ) message to the initiator 702, in step 706. Hence, the context information can be shared and exchanged between the electronic devices using context RTD in the NFC network.

Further, the context RTD can also be used for other short-range wireless communication networks applications. For example, the context RTD can be used for enabling BT applications. In an embodiment of the present invention, the communication between the electronic devices for sharing the context information is performed using a BT profile or a WiFi transfer mechanism. In an embodiment of the present invention, a third device, source 710, requests context information using a GET_CONTEXT_INFO( ) primitive over BT wireless technology. In an embodiment of the present invention, the request for context information is done after proper authentication of electronic devices.

At step 714, the source 710 request for context data from a receiver, sink 712, using GET_CONTEXT_INFO( ). The sink 712, then encapsulates the context data through a BT profile and sends the context data using the SEND_CONTEXT_INFO( ) primitive. At step 716 and 718, the sink 712 and the source 710 share context information (CA_RTD). The message primitives are representative in nature and can be expanded or added based on a use case.

For exchange of context data between two NFC enabled devices and/or for communicating the context data over BT various Application Programming Interfaces (APIs) are used. Some of the APIs are defined below for reference. However, the invention is not limited to the APIs listed below and a person ordinarily skilled in the art can use any other API's.

REQUEST_CONTEXT_INFORMATION( ): The API is used to get the context data from another NFC enabled device.

RECEIVE_CONTEXT_INFORMATION( ): The API is used to receive context data when the context data is requested or pushed by another device.

SEND_CONTEXT_INFORMATION( ): The API is used to send context data when the context data is requested and/or when sending as unsolicited messages over BT.

GET_CONTEXT_INFORMATION( ): The API is used to get context data from other BT enabled devices.

SUBSCRIBE_CONTEXT_INFORMATION: The API is used when a periodic update of some context data is expected from an NFC/BT enabled entity.

Figure 8:
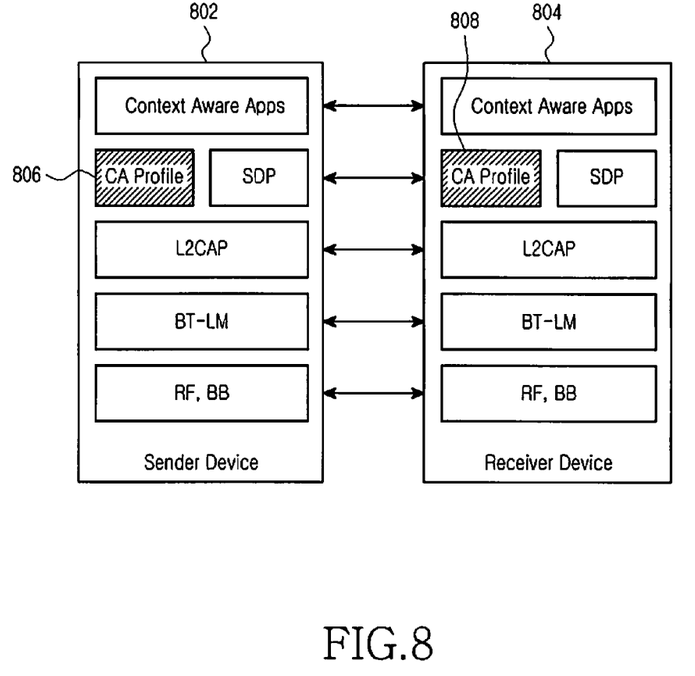
FIG. 8 is a diagram illustrating a BT protocol stack incorporating Context Aware (CA) profile for exchanging context data, in accordance with an embodiment of the present invention.

FIG. 8 illustrates a BT protocol stack incorporating a CA profile for exchanging context data, in accordance with an embodiment of the present invention. In an embodiment of the present invention, an electronic device 802 (also referred to as a sender device) sends CA data to an electronic device 804 (also referred to as a receiver device). The sender device 802 and the receiver device 804 have identical BT protocol stack including Service Discovery Protocol (SDP), Logical Link Control Adaptation Protocol (L2CAP), Link Manger (LM), Baseband (BB) and Radio Layer (RF).

The sender device 802 and the receiver device 804 have respective CA profiles, 806 and 808, that enable the devices to exchange shared context information. The sender device 802 sends the context information using CA profile encapsulating Context RTD in the primitives SEND_CONTEXT_INFORMATION, GET_CONTEXT_INFORMATION, and SUBSCRIBE CONTEXT_INFORMATION, which is in turn used by the CA application.

Figure 9:
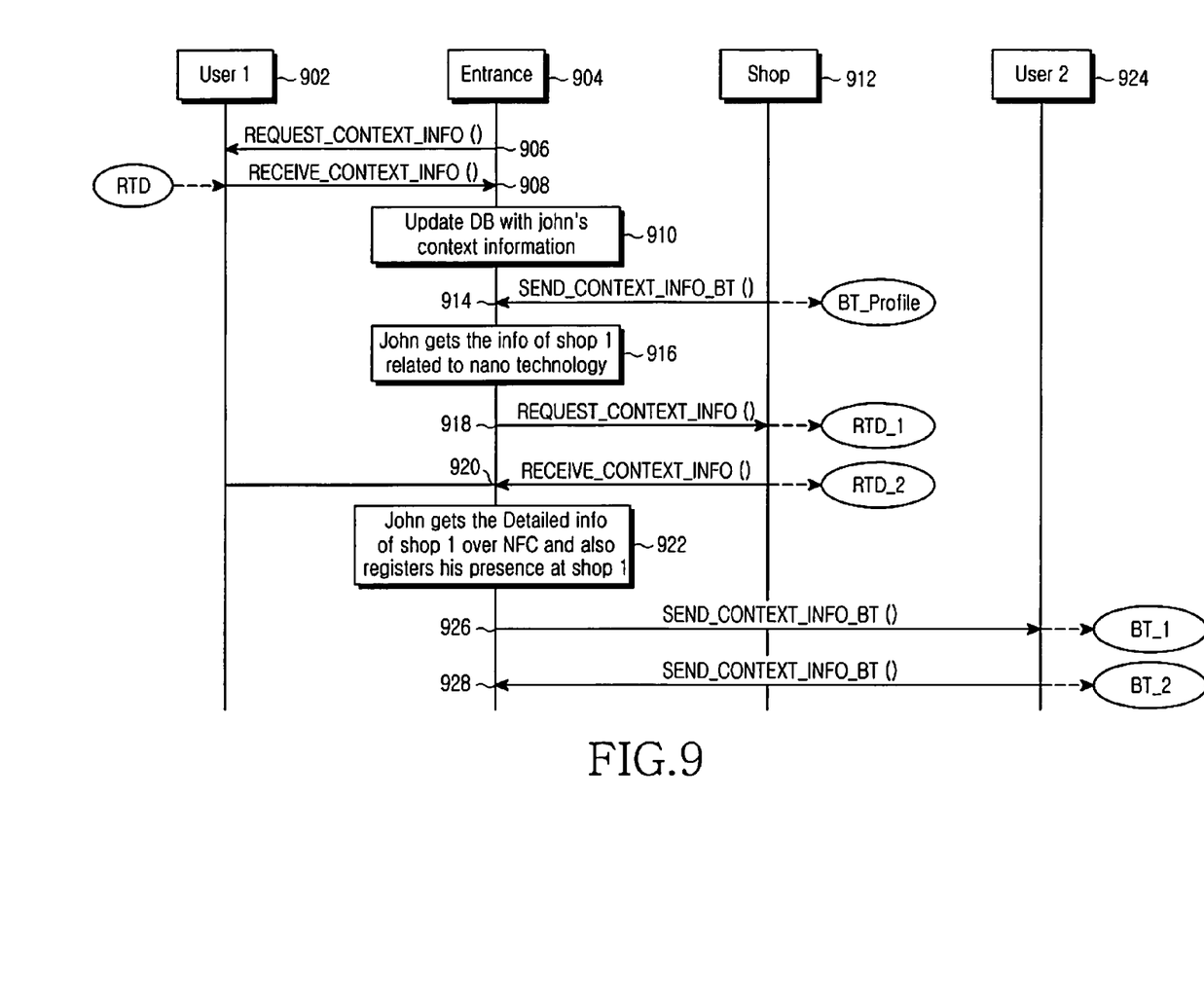
FIG. 9 is a diagram illustrating use of the invention, in accordance with an embodiment of the present invention.

FIG. 9 is an example of the invention, in accordance with an embodiment of the present invention. The following example is solely for the sake of clarity and does not limit the scope of the invention.

User 1 902 visits an exhibition fair in a particular city. The exhibition fair has plurality of stalls, for example, 5000 stalls. User 1 902 has an interest in Nano technology material. Hence, User 1 902 updates his mobile phone with Nano technology context. Thereafter, User 1 902 carries an NFC enabled mobile phone, for example, the electronic device 102, into the exhibition fair. There, User 1 902 establishes an NFC with the aggregator, for example, the electronic device 104, at an entrance 904.

Thereafter, at step 906, the aggregator 104 sends a request to the electronic device 102 about context data using REQUEST_CONTEXT_INFO( ) primitive. At step 908, User 1 902 sends context data in a context RTD format to the aggregator 104 using RECEIVE_CONTEXT_INFO( ) primitive. At step 910, the context data and preferences of Nano technology associated with User 1 902 are captured and updated in a data management system.

The aggregator 104 also captures and assembles information about a plurality of stalls in the exhibition fair. For example, a shop 912 sends the context information to the aggregator 104 using a short-range wireless communication profile, for example a BT profile. At step 914, the shop 912 sends the context information using SEND_CONTEXT_INFO_BT( ). At step 916, User 1 902 gets information about the shop 912.

Thereafter, User 1 902 will be prompted through BT profile and connectivity if he/she crosses a stall of Bio-tech sensors related to Nano technology. Therefore, the context data can be requested and received based on the interest of User 1 902 and preferences. The context data can be received at step 918 and sent at step 920 based on the REQUEST_CONTEXT_INFO( ) primitive and RECEIVE_CONTEXT_INFO( ) primitive. At step 922, when User 1 902 crosses the stalls in the exhibition fair, the context data is exchanged between the shop 912 and User 1 902 electronic device. Further, User 1 902 also gets the specific information as per the interest through NFC.

In addition, User 1 902 may also receive regular prompts about different users who have visited the same stall, for example User 2 924. These exchange happen using Context RTD over other carriers such as BT or WiFi. The exchange is shown at step 926 and step 928. Hence, this enables a virtual social networking in an ad-hoc real-time fashion. The message sequence diagram is shown in FIG. 6.

As per the example discussed above, User 1 902 preferences are stored on his mobile device as a ContextRTD as represented in Table D. Table D represents ContextRTD at User 1 902 mobile device when he is entering the premises of the exhibition. Although, Web Ontology Language "OWL" is used in the Table D as a representation format for context RTD information, it will be apparent to the person skilled in the art that representation format, such as XML, RDF, and RDFS can also be used.

TABLE D

MB =
MF =
CF =
SR =
Ox04
Payload Length 1 =
ID Length =
Type = 0x0010 (CA)
ID = 0x00010100 (User Interest)
Privacy Flag = 0x01 (Enabled)
Field Privacy Flag = 0x000 (Disabled) All fields are visible to all users.
V= 0x0001
Time Specific Validity Fields = 0x00001111 (Valid for 15 mins)
Location Specific Validity = (0x0010000,0x01010100) GPS co-ordinates Venue.
Constraints on Interpretation of Record =
http://pervasive.semanticweb.org/ont/dev/person.
± <<owl:DatatypeProperty rdf:ID="name" = xyz>
± <<owl:DatatypeProperty rdf:ID="firstName" = User 1>
± <<owl:DatatypeProperty rdf:ID="middleName" = MyMiddleName>
± <<owl:DatatypeProperty rdf:ID="lastName" = MyLastName>
± <<owl:DatatypeProperty rdf:ID="givenName" = MyNickName>
± <<owl:DatatypeProperty rdf:ID="familyName">
± <<owl:Class rdf:ID="Gender" = Male>
± < <owl:ObjectProperty rdf:ID="workplaceHomepage" = http://myhomepage>
± ± <owl:ObjectProperty rdf:ID="hasContactProfile" = Yes
PrivacySetting =
Disable>
± <<<owl:ObjectProperty rdf:ID="hasHomeContactProfile" = None>
+
<<<owl:ObjectProperty rdf:ID="hasInterest" = NanoTechnolgies>
<<<owl:ObjectProperty rdf:ID="hasSpecificInterest" = Carbon Nano Technologies>
<<<owl:ObjectProperty rdf:ID="hasPresence" = IMS>
<<<owl:ObjectProperty rdf:ID="SharePresence" = Enabled>
<<<owl:ObjectProperty rdf:ID="NFCPresenceUpdate" = Yes>

The "REQUEST" and "RECEIVE" CONTEXT_INFO( ) primitives are used to exchange the context information at the entrance. After the context information is exchanged, a system stores and updates a relevant database along with aggregated context data. Hence at a particular location, for example, at Shop 912, a system at Shop 912 recognizes the interest of the User 1 902, and pushes the context information as a BT Profile which is shown in Table E. Table E is a representative context RTD of Shop 912 which specializes in Nano Technologies.

TABLE E

MB =
MF =
CF =
SR =

TABLE E-continued

Ox04
Payload Length 1 =
ID Length =
Type = 0x0010 (CA)
ID = 0x00010110 (Product Information)
Privacy Flag = 0x00 (Disabled)
Field Privacy Flag = 0x000 (Disabled) All fields are visible to all users.
V= 0x0001
Time Specific Validity Fields = 0x00001111 (Valid for 15 mins)
Location Specific Validity = (0x0010000,0x01010100) GPS co-ordinates Venue.
Constraints on Interpretation of Record =
http://s.ics.upjs.sk/~vanekova/Software/data/classification.rdf-xml.owl.
+
± <owl:Class rdf:ID="specialized_trade" = Nano Technology>
± <owl:Class rdf:ID="bRegulatory_Affairs-IPR" = IPRs for Nano>
± <owl:Class rdf:ID="pcNano_products" = XYZ>
± <owl:Class rdf:ID="nanoSoftware_publishing" = ABC>
± <owl:Class rdf:ID="NanoWhitePaper"= 123>
± <owl:Class rdf:ID="nanoTradeOpportunities" = A,B,C>
± <owl:Class rdf:ID="nanoEngineeringOpportunities" = DEF>
± <owl:Class rdf:ID="nanoManufacturing" = LMN>
± <owl:Class rdf:ID="nanoOther_information_service_activities" = ABC>

There may be multiple instances of this context RTD which can be shared based on the events/updates that are generated. In this case, a generic ContextRTD is generated and sent to the system at Shop 912, when the system does not know specific interest of User 1 902. After receiving the context information, the electronic device at User 1 902 analyzes received information and generates relevant alterations for User 1 902.

Alerts are sent to User 1 902 stating information about presence of Nano Technology related information at Shop 912. Thereafter, on receiving the alerts, User 1 902 decides to visit Shop 912. At the entrance of Shop 912, User 1 902 exchanges his context information to over the NFC enabled device using the REQUEST and RECEIVE primitives. The associated ContextRTD is shown in Tables D and F. Table F represents ContextRTD exchanged based on User 1 Interest.

TABLE F

MB =
MF =
CF =
SR =
Ox04
Payload Length 1 =
ID Length =
Type = 0x0010 (CA)
ID = 0x00010110 (Product Information)
Privacy Flag = 0x00 (Disabled)
Field Privacy Flag = 0x000 (Disabled) All fields are visible to all users.
V= 0x0001
Time Specific Validity Fields = 0x00001111 (Valid for 15 mins)
Location Specific Validity = (0x0010000,0x01010100) GPS co-ordinates Venue.
Constraints on Interpretation of Record =
http://s.ics.upjs.sk/~vanekova/Software/data/classification.rdf-xml.owl.
+
± <owl:Class rdf:ID="specialized_trade" = Nano Technology>
± <owl:Class rdf:ID="bRegulatory_Affairs-IPR" = IPRs for Nano>
± <owl:Class rdf:ID="pcNano_products" = Carbon Nano Technologies>
± <owl:SubClass rdf:ID="pcNano_products_1" = Carbon Nano Tubes>
± <owl:SubClass rdf:ID="pcNano_products_2" = Carbon Nano Displays>

Once the context information is exchanged, the system at User 1 902 electronic device, the system at the Shop 912, and aggregator 104 at the entrance update the relevant database and generate appropriate notification and events for other users. For example, in this case, User 2 924 whose interest is similar to that of User 1 902 may be notified of the presence of User 1 902 at Shop 912 over BT or WiFi. When User 1 902 crosses User 2 924, the system generates an event at the device of User 2 924 stating that User 1 902 in close vicinity. This event leads to an exchange of context information over the BT profile using the BT Context Profile.

Various embodiments of the present invention described above provide the following advantages. The present invention provides a method for exchanging context data in an NFC network. The method also defines a new RTD for representing context data for NFC. Further, the method in presence of multiple sensor information aggregates context data in a context RTD format in the electronic device. The method enables exchange of context information between a plurality of electronic devices in NFC. The method also provides exchange of context information between an NFC enabled electronic device and an NFC Tag in the NFC. The invention can also provide context information over other short-range wireless communication networks, for example BT, by reuse of the Context RTD using a BT profile. Further, the method maintains interoperability between the NFC context RTD and the BT applications. The use of standardized form of context data facilitates dynamic updating of context information and exchange of context information, which can further be used by various applications. This definition and exchange of context RTD and usage over various wireless networking environment assists in creating a social networking among plurality of users. The method further provides contextual information exchanges and CA services in NFC.

While the invention has been shown and described with reference to certain preferred embodiments thereof, it will understood by those skilled in the art that various changes in form and detail may be made therein without departing from the spirit and scope of the invention as defined in the appended claims.

We claim:

1. A method for managing data between a first electronic device and a second electronic device in a Near Field Communication (NFC) network, the method performed at the first electronic device and comprising the steps of:
    receiving a request at the first electronic device from the second electronic device to send context data when the first electronic device and the second electronic device are in close proximity to one another, wherein the context data changes based on an environment of a user of the first electronic device by updating, by the first electronic device, the context data with information of sensors received from an aggregator which aggregates the information from the sensors;
    representing the context data in accordance with a context Record Type Definition (RTD), wherein the context RTD is used to define context data in the NFC network;
    exchanging the context data that is represented in accordance with the context RTD with the second electronic device; and
    encapsulating the context data with control parameters in the context RTD prior to exchanging the context data with the second electronic device.

2. The method of claim 1, wherein exchanging the context data comprises interchanging one or more NFC RTDs with the second electronic device.

3. The method of claim 1, further comprising managing Bluetooth applications based on the context data represented using context RTD and one or more Bluetooth profiles.

4. The method of claim 1, further comprising:
    receiving context data from a plurality of the electronic devices through at least one of a plurality of wireless communication networks; and
    aggregating the context data received from the plurality of electronic devices based on the context data received from each of the plurality of electronic devices.

5. The method of claim 1, further comprising initiating a communication network between the first electronic device and the second electronic device based on at least one of a peer-to-peer mode of communication and reader/writer mode of communication.

6. The method of claim 5, wherein initiating the communication network comprises establishing one or more short range wireless communication networks.

7. The method of claim 1, wherein the context data includes one of a current location of the user, room temperature and the user's presence.

8. A system for managing data between a plurality of electronic devices in a Near Field Communication (NFC) network comprising:
    a first electronic device for receiving a request from a second electronic device to send context data when the first electronic device and the second electronic device are in close proximity to one another, wherein the context data changes based on an environment of a user of the first electronic device by updating, by the first electronic device, the context data with information of sensors received from an aggregator which aggregates the information from the sensors, for representing the context data in accordance with a context Record Type Definition (RTD), wherein the context RTD is used to define context data in the NFC network, for exchanging the context data that is represented in accordance with the context RTD with the second electronic device, and for encapsulating the context data with control parameters in the context RTD prior to exchanging the context data with the second electronic device; and
    the second electronic device for sending the request to send the context data, to the first electronic device.

9. A first electronic device in a Near Field Communication (NFC) network comprising:
    a processor for representing context data in accordance with a context Record Type Definition (RTD), wherein the context data changes based on an environment of a user of the first electronic device by updating, by the first electronic device, the context data with information of sensors received from an aggregator which aggregates the information from the sensors, wherein the context RTD is a record type definition used for defining a context data in the NFC network and for encapsulating the context data with control parameters in the context RTD prior to exchanging the context data with the second electronic device; and
    a transceiver for receiving a request from the second electronic device to send the context data when the first electronic device and the second electronic device are in close proximity to one another, and exchanging the context data that is represented in accordance with the context RTD with the second electronic device.

* * * * *